United States Patent [19]

Wood

[11] Patent Number: 4,778,553
[45] Date of Patent: Oct. 18, 1988

[54] METHOD OF LINING A PIPELINE WITH A FLEXIBLE TUBULAR SLEEVE

[75] Inventor: Eric Wood, Castletown, Isle of Man

[73] Assignee: Insituform Licensees, B.V., Amsterdam, Netherlands

[21] Appl. No.: 39,554

[22] Filed: Apr. 16, 1987

[30] Foreign Application Priority Data

Apr. 16, 1986 [GB] United Kingdom ............... 8609307

[51] Int. Cl.$^4$ .............................................. B29C 63/36
[52] U.S. Cl. .................................... 156/287; 138/93; 138/141; 156/289; 156/294; 156/423
[58] Field of Search ............... 156/196, 287, 294, 423, 156/289, 249; 264/267–270, 259, 262–263, 573, 566, 512, 285, 239, 500; 138/141, 97, DIG. 6

[56] References Cited

U.S. PATENT DOCUMENTS

| | | | |
|---|---|---|---|
| 3,500,819 | 3/1970 | Silverman | 156/294 |
| 4,009,063 | 2/1977 | Wood | 156/294 |
| 4,182,262 | 1/1980 | Everson et al. | 156/294 |
| 4,325,772 | 4/1982 | Suetoshi et al. | 138/97 |
| 4,366,012 | 12/1982 | Wood | 138/97 |
| 4,602,974 | 7/1986 | Wood et al. | 156/294 |
| 4,668,125 | 5/1987 | Long | 138/141 |

*Primary Examiner*—David Simmons
*Assistant Examiner*—David Herb
*Attorney, Agent, or Firm*—Klauber & Jackson

[57] ABSTRACT

The invention provides a method of applying a resin impregnated lining sleeve to a length of passageway surface wherein the sleeve first of all has a carrier tube everted into the sleeve from one end and out of the other end, the carrier tube is re-inverted to draw the sleeve into the carrier tube and then the assembly of carrier tube and sleeve is positioned in relation to the passageway length to be lined and the carrier tube re-everted to position the sleeve on the surface in the required position. The resin is subsequently cured and the carrier tube removed leaving a hard tubular lining shell on the passageway surface.

16 Claims, 6 Drawing Sheets

METHOD OF LINING A PIPELINE WITH A FLEXIBLE TUBULAR SLEEVE

This invention relates to the lining of pipelines and passageways, especially underground pipelines or passageways and is concerned with the placement on the surface of the pipeline or passageway of a flexible tubular liner which includes or comprises an absorbent material which is impregnated with a curable synethetic resin, and when the flexible liner is placed on the passageway surface, it is held thereto, by means of fluid pressure, until such times as the resin has cured hard, in order to re-habilitate the pipeline or passageway for preventing ingress of surrounding ground water and liquid of the medium carried by the pipeline or passageway into the surrounding soil.

The application of linings to passageway surfaces in accordance with the general method to which the invention relates is now practised widely throughout the world, and typically the best known method comprises everting the lining into and along the passageway by means of fluid pressure, and holding the lining against the pipeline or passageway whilst heat is applied thereto in order to heat cure the resin impregnating the lining, as described in U.S. Pat. No. 4,009,063.

In a more recent development, a light curable resin is used in the lining, and instead of utilising heat to effect the cure, light energy is used.

This method has wide application and is widely practised throughout the world for the lining of main sewers, but has some drawbacks in that one end of the lining tube has to be closed to enable the inversion to take place, and the closed end, after curing of the resin, has to be cut away to re-establish the flow capability of the sewer. This cutting away is normally done at manholes by having an operator enter the manhole with a power saw or the like for cutting away the closed end of the cured lining. This represents an extra and dangerous operation and therefore extra expense and inconvenience. Also the known method is limited in its application to what are known as "laterals" being the pipes connecting the sewage and waste pipes from buildings to the main sewers, insofar as when the closed end is inside the laterals, because of the smaller diameter of the laterals it is difficult to re-open the closed end of the lining tube, and such re-opening may require digging up the street or road adjacent the building. Consequently, although many millions of these lateral pipes may be in need of repair by re-lining, the above noted method has scarcely been used in relation thereto because of the limitations mentioned. In many cases, where the laterals are below the surrounding water table, lining of the main sewer does not result in a complete repair, because if the laterals are leaky, then the ground water can still enter the main sewer by leaking through the lateral walls.

Furthermore, the material which is conventionally used in the known method comprises a felt material on one side of which is coated a film, usually a polyurethane film, which acts as a barrier between the resin soaked felt and the everting fluid, usually water. The film is usually left inside the sewer or other pipe after the lining operation has been completed and lies to the inside of the lining tube.

The coating has to be applied to the felt by means of a special coating method and adds considerably to the cost of the lining material. Also, in many cases, after the resin has cured, the film is unnecessary and in many cases may be undesirable (for example because of chemical reaction between the film and the material or fluid to be carried by the lined pipeline). Therefore, a lining system which could place a resin impregnated lining tube which does not require the aforesaid coating on the surface of a pipeline or passageway would be highly desirable.

The present invention seeks to provide a lining method whereby the impregnated lining tube may be placed in the passageway surface and held thereto whilst the resin cures to form a hard, resin lining tube on the passageway surface, similar to the method described in the said U.S. Pat. No. 4,009,063, but wherein the tube is open ended and coating of the resin impregnated liner tube may not be necessary.

According to the present invention there is provided a method of lining a pipeline or passageway with a tubular sleeve comprising a flexible resin absorbent material, said method comprising the steps of:

(ia) impregnating the tubular sleeve with a curable synthetic resin;

(ib) everting a flexible carrier tube into one end of the resin-impregnated sleeve, along the inside of the sleeve and out of the other end of the sleeve;

(ic) inverting the carrier tube in the opposite direction to pull one end of the sleeve into the inside of the carrier sleeve so that at least a substantial portion of the sleeve is drawn into the inside of the carrier tube;

(id) positioning one end of the assembly or carrier tube and resin-impregnated sleeve in operative position in relation to a passageway to be lined;

(ie) everting the carrier tube by fluid pressure into the passageway so that the impregnated sleeve is also everted into the passageway and lies on the passageway surface between the carrier tube and the said passageway surface; and (if) causing or allowing the resin to cure whilst it is so held to the passageway surface.

The said carrier tube may be of polymeric material which does not bond to the resin and the method may include the step of removing the carrier tube after curing of the resin by re-inverting the carrier tube, so that it may be re-used.

The said carrier tube preferably comprises silicone rubber, and the tubular sleeve may be contained in a flexible envelope of synthetic plastics material. The step of impregnating the sleeve may comprise introducing the resin into the envelope whilst a vacuum is applied thereto to remove air from the absorbent material and it is preferred that the said envelope be removed before the sleeve is pulled into the inside of the carrier tube.

The method may include the steps of measuring the length of the pipeline or passageway to be lined and by using a corresponding length of sleeve. The sleeve may be pulled into the carrier tube to a predetermined extent and the assembly may be positioned in relation to the passageway to ensure that the sleeve is positioned only on the required length of pipeline or passageway.

It is preferred that the carrier tube be everted into the passageway by means of air pressure, although it is possible to use liquid pressure if required.

The resin may be cured by introducing hot water into the carrier tube when it is in position holding the impregnated sleeve to the passageway surface by applying the hot water through a hose connected to an end of the carrier tube.

In a specific method, a lateral pipe connecting the sewage system of a building to an underground sewer is lined, and the additional steps are included. The carrier tube is everted into the passageway from above ground, and the sleeve is drawn into the carrier tube to a limited extent so as to leave an extension portion to the outside of the carrier tube. An extremity of said extension portion is folded over a displacing device; the folded over extension portion is introduced vertically into the cleanout pipe of the lateral until the extremity portion passes a water trap bend in the pipe. The displacing device is then moved to cause the extremity portion to unfold, and following such unfolding, the eversion is performed.

Embodiments of the invention will now be described by way of example and with reference to the accompanying drawings, wherein.

Figures 1, 2:
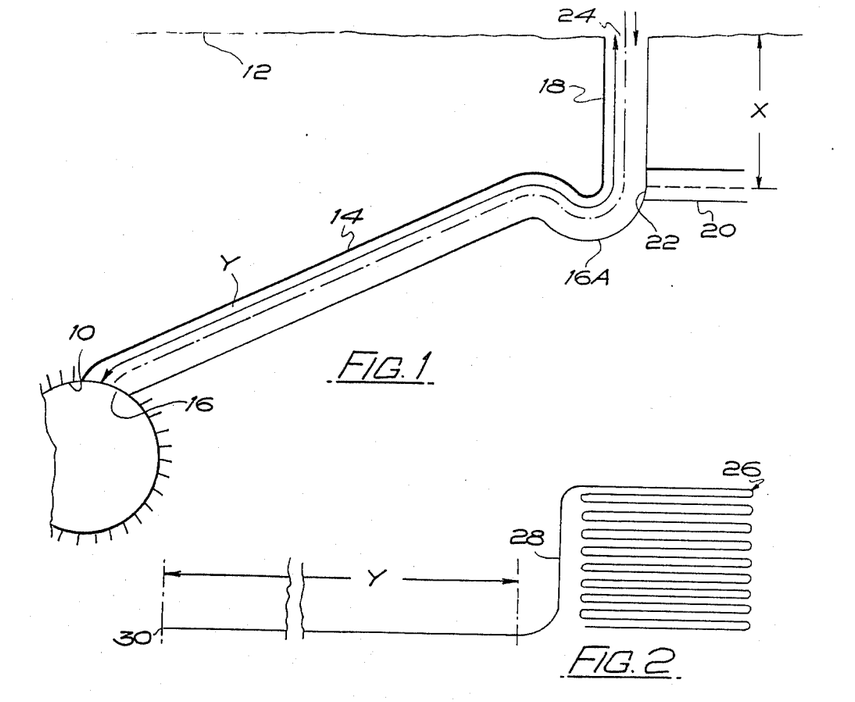
FIG. 1 is a sectional elevation illustrating a main underground sewer and a lateral pipeline which is connected to the main sewer and which is to be lined.
FIG. 2 is a schematic view illustrating the removal of a section of the lining sleeve for the lining of the lateral pipeline of FIG. 1.

Referring now to the drawings in more detail, FIG. 1 shows in sectional elevation a main underground sewer pipe 10 which is located under the ground level 12 as shown. A lateral connecting pipe 14 which is to be lined leads into the sewer 10 at the location 16, and the pipe 14 has a water trap bend 16A connected to the ground level by means of a cleanout pipe 18, the top of the cleanout pipe 18 at ground level normally being covered by a manhole cover or the like. The waste material pipe from the adjacent domestic building is indicated by the reference 20 and leads into the cleanout pipe 18 as shown at an opening 22 which is located at a distance designated X below the ground level 12.

In the operation of lining the lateral pipe 14 it may be that only a section of the pipe needs to be lined, for example a section leading from the opening 16 up to a position short of the water trap bend 16A, but in the example to be described the lining will take place throughout the lengths Y of the pipe 14 from the opening 16 into the sewer to the opening 24 at ground level 12.

In order to perform the lining operation, a number of steps have to be performed and these are generally illustrated and described with reference to the FIGS. 2 to 23.

In FIG. 2 there is shown a supply 26 of tubular lining material 28. The end 30 of the material is pulled from the stack 26, and a length Y, or perhaps slightly longer than Y, is cut from the supply so as to provide the lining sleeve for the lateral pipe 14.

Figure 4:
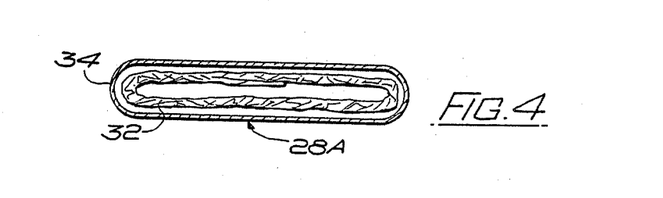
FIG. 4 is a sectional elevation of the sleeve of FIG. 3, the section being on line IV—IV of FIG. 3.

The form of the lining material is shown in FIG. 4, and it will be seen to comprise an inner layer 32 of a resin absorbent material such as a fibrous felt, and an outer loose envelope 34 of a polyurethane or the like plastics material film, which preferably is transparent in nature.

Figure 3:
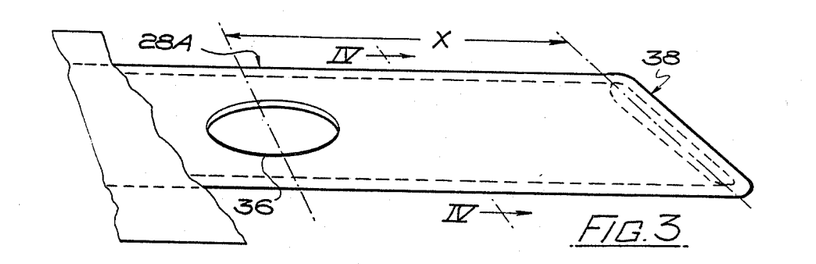
FIG. 3 is an enlarged perspective view of an end of the section of lining sleeve shown in FIG. 2.

After removing the length of lining sleeve, a section of the sleeve is removed to provide an aperture 36 as shown in FIG. 3, which aperture 36 is displaced by the distance X from the adjacent end 38 of the sleeve. When the lining sleeve 28A is inserted in the lateral pipeline 14 as will be explained, the aperture 36 is aligned with the connecting aperture 22 between the cleanout pipe 18 and the discharge pipe 20.

Before the sleeve 28A is ready for use, curable synthetic resin such as epoxy or polyester resin is injected into the sleeve and the sleeve is passed through nip rollers or is otherwise pressed, to ensure even distribution of the resin throughout the felt material 32 so much so that the felt material becomes impregnated with the resin.

When the lining tube has been thus impregnated, it is laid in a position ready to receive a carrier tube in the manner described hereinafter in relation to FIGS. 7 to 12.

Figure 5:
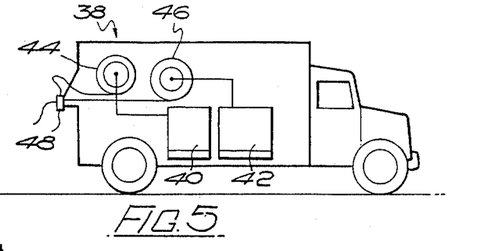
FIG. 5 is a schematic view of the operator's truck used in the method of the invention.
Figure 6:
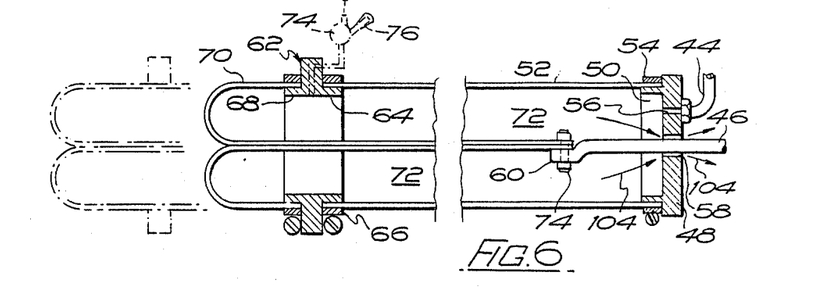
FIG. 6 is a sectional elevation of an air inflation device used in the method of the invention.
Figure 7:
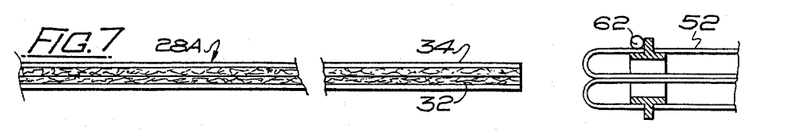
FIGS. 7 to 12 show sequentially the steps involved in the loading of the sleeve of FIG. 2 in the carrier tube shown in FIG. 3.

It is convenient at this time to refer to FIGS. 5 and 6 to illustrate the function and construction of the carrier tube.

As shown in FIG. 5, a lorry or truck 38 is provided in the rear compartment thereof with a compressor 40, a water heater 42, a reel of air hose 44, and a reel 46 of a strong water hose. The water hose and air hose are brought out to a fitting 48 at the rear of the truck, and they are coupled to the fitting in the manner as illustrated in FIG. 6. As shown in that figure, the air hose 44 is coupled to a plate 48 having a circular bush 50 on which is mounted an inflation tube 52 which is clamped to the bush 50 by means of a clip 54 which may be for example a jubilee clip.

The air hose 44 connects pneumatically with the interior of the inflation tube 52 by means of a passage 56 in the plate 48.

Additionally, the plate 48 has a central aperture 58 through which the water hose 46 passes and an end 60 of the water hose is located inside the inflation sleeve 52.

At its other end, the inflation sleeve 52 is connected to a further fitting 62 being in the nature of a collar, such fitting providing a bush portion 64 which supports the other end of the inflation tube 52 as shown, and such other end is clamped or clipped to the collar 62 by means of a clip 66 which may also be for example a jubilee clip.

At the other side of the collar 62 is a further bush portion 68 on which is mounted on an end of a carrier tube 70 which as shown in FIG. 6 is turned inwardly upon itself into the interior cavity 72 defined by the inflation sleeve 52. The inner end of the tube 70 is connected to the end 60 of the hose 46 by means of a clamp or the like 74.

The diagram shows a break in the length of the inflation tube 52 and the assembly in general and this is because the inflation tube 52 can be any desired length depending upon the length of lining sleeve to be applied to the lateral. In practise, it has been found that for the lining of laterals of the order of 6 to 8 inches in diameter, the maximum length of lining sleeve which can be handled is of the order of 60 linear feet, and therefore inflation tube 52 should be of the order of the maximum length which can be handled, and the carrier tube 70 will be of a like length and may perhaps be slightly longer.

It can be seen from an examination of FIG. 6, that if compressed air 44 is introduced into the interior 72 of inflation sleeve, the carrier tube 70 will be everted outwardly of the collar 62, which is the leading collar, plate 48 forming the trailing collar, and one extended position as shown in chain dotted lines in FIG. 6.

As the tube 70 is everted as shown in FIG. 6, so the end 72 moves leftwards in FIG. 6, taking with it the hose 46. The hose 46 will thus be tensioned, and in fact under such tension will stretch slightly so that it passes easier through the central aperture in the plate 48. The hose 46 acts in fact as a pullback device controlling the rate at which the tube 70 everts from the collar 62.

Collar 62 is provided with a manually operable pressure relief device 74 which can be operated by turning the handle 76 in order to relieve the internal pressure in the inside of the inflation tube 52.

The collar 48 is in fact mounted on an elevated structure at the rear of the truck as this is the most convenient location for same.

If reference is now made to FIGS. 7 to 12, it will be seen clearly how the device of FIG. 6 is used in conjuction with the length of lining sleeve 28A illustrated in FIG. 3.

Figure 8:
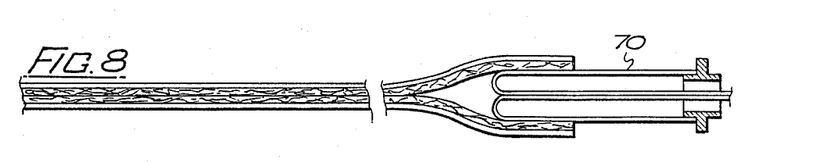
Figure 9:
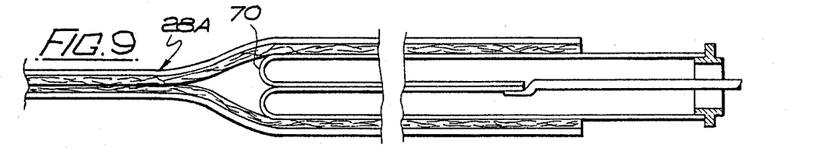
Figure 10:
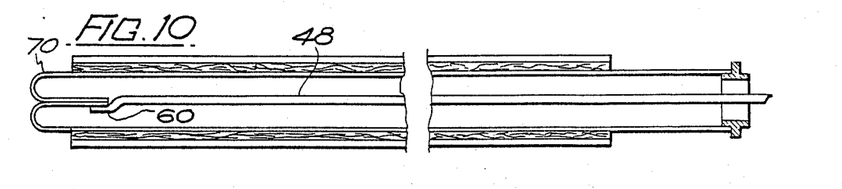

As shown in FIG. 2, the lining sleeve 28A is laid out for example underground after impregnating same with the curable synthetic resin. The leading collar 62 is aligned with one end of the sleeve 28A, and then air under pressure is introduced into the interior of the inflation tube 52 through the air supply pipe 44. The carrier tube 70 everts as shown in FIG. 8, and is directed into the interior of the sleeve 28A. As the process continues, the carrier tube 70 everts further into the sleeve 28A as shown in FIG. 9, until the everting portion of the carrier tube 70 projects out of the other end as shown in FIG. 10. In this position, the end 60 of the hose has passed almost completely through the sleeve from one end to the other end thereof.

Figure 11:
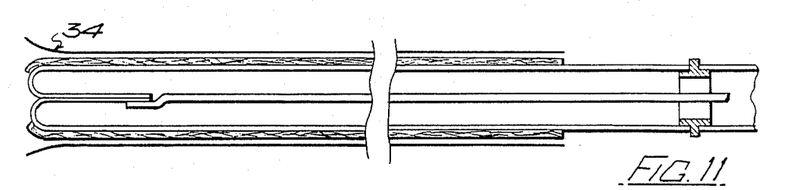
Figure 12:
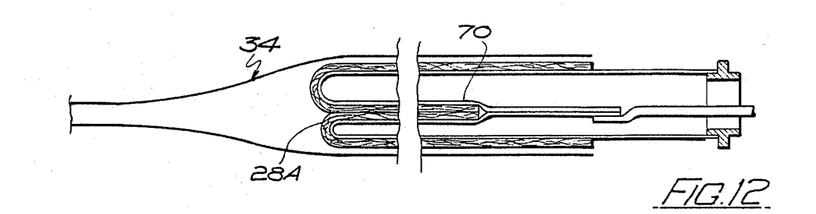

In the next stage of operations, the hose 48 is pulled in the opposite direction so that the tube 70 starts to re-invert as shown in FIG. 11 when the inverting phase is in alignment with the end of the lining sleeve. At this point, the end of the lining sleeve is caused to invert inwardly with the carrier tube 70, using hand manipulation if necessary, and the outer envelope 34 being at this time held clear of the inverting end so that in fact the envelope can be removed as shown in FIG. 12. FIG. 12 also shows the position when a substantial portion of the lining tube has been inverted into the inside of the carrier tube 70. The lining sleeve 28A at this time is therefore made up of the resin impregnated absorbent material.

Figure 13:
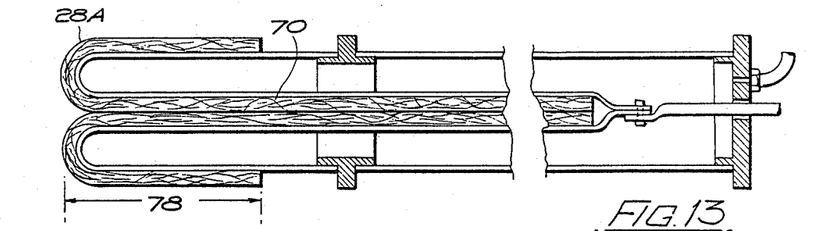
FIG. 13 is a sectional view similar to FIG. 6 but showing the impregnated sleeve fully loaded in the carrier tube.

FIG. 13 shows the finished arrangement. The carrier sleeve 70 has been re-inverted so that it has reached the original position shown in FIG. 6 except that nearly all of the impregnated sleeve 28A has been drawn into the inside of the carrier sleeve 70.

The assembly shown in FIG. 10 is now ready to be used at the site for the lining of the lateral pipe 14.

Figure 14:
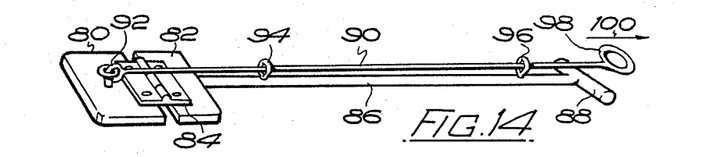
FIG. 14 is a perspective view of a holding device for holding the sleeve and carrier tube whilst it is inserted in the passageway to be lined.
Figure 15:
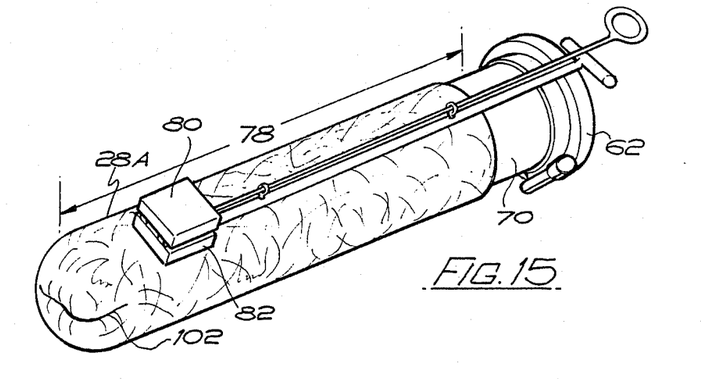
FIGS. 15 and 16 are a perspective view showing how the device of FIG. 14 is used.
Figures 16, 17, 18, 19:
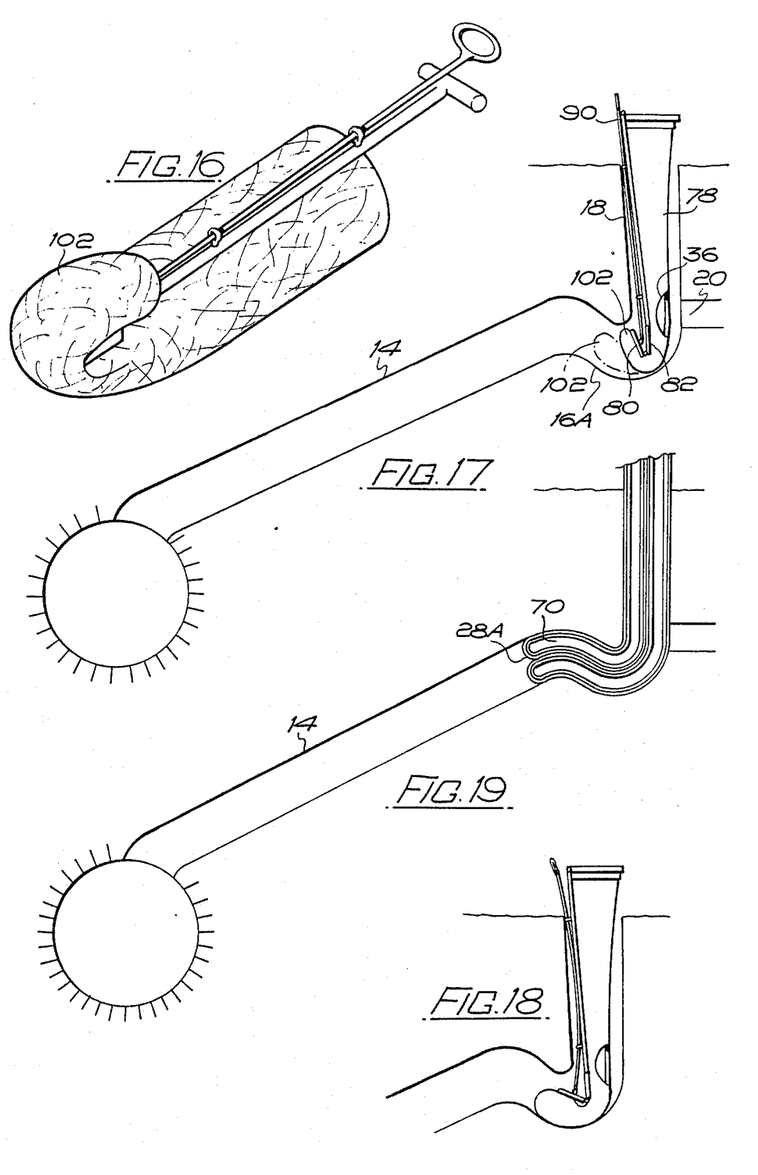
FIG. 17 is a view similar to FIG. 1, but shows how the assembly is introduced into the passageway to be lined.
FIGS. 18 to 23 shown in sequential steps the lining process, FIG. 23 showing the final result.

In order to effectively insert the extended portion 78 of the assembly shown in FIG. 13 directly into the top of the cleanout pipe 18 a tool such as that shown in FIGS. 14 to 16 is used. This tool comprises a pair of plates 80, 82 connected by a hinge 84. To one of the plates 82 is connected a support handle 86 having a handle group 88 at the end thereof remote from the plate 82. The other plate 80 is connected to push rod 90 by means of an eye connection 92, and the push rod 90 is kept in position in relation to handle rod 86 by eyes 94, 96 through which the rod 90 passes. At the end remote from plate 80, the rod 90 is provided with a handle 98. To use the device shown in FIG. 14, the handle 98 is first of all pulled in the direction 100 relative to the support rod 86 which holds the plate 80 onto the plate 82 as shown in FIG. 15. This figure also shows that the device is laid on the extension 70A so that the plates 80 and 82 are a short distance 102 from the end of the extension 78. The extremity portion indicated by length 102 is then folded over the plates 80 and 82 as shown in FIG. 16 and the assembly is now ready for insertion into the cleanout pipe, and FIG. 17 shows how it is inserted. In the condition shown in FIG. 17, the assembly is simply pushed into the cleanout pipe until the position shown in FIG. 17 is reached. During the pushing in, the extremity portion 102 will be held in the folded condition until it passes the water trap bend 16A. When it is in this position, it should be noted that the aperture 36 is now aligned with the connecting opening 20 between the discharge pipe and the cleanout pipe 18 so that when the lining has been applied as will be explained, the waste material can still flow through the discharge pipe 20 into the lined lateral pipe 14.

When the extension portion 78 has been inserted as shown in FIG. 17, the handle 98 of the device of FIG. 14 is now pushed in the opposite direction to re-open the hinge plates which causes the extremity portion 102 to turn and face along the lateral pipe as shown in dotted lines in FIG. 17.

Figures 20, 21, 22:
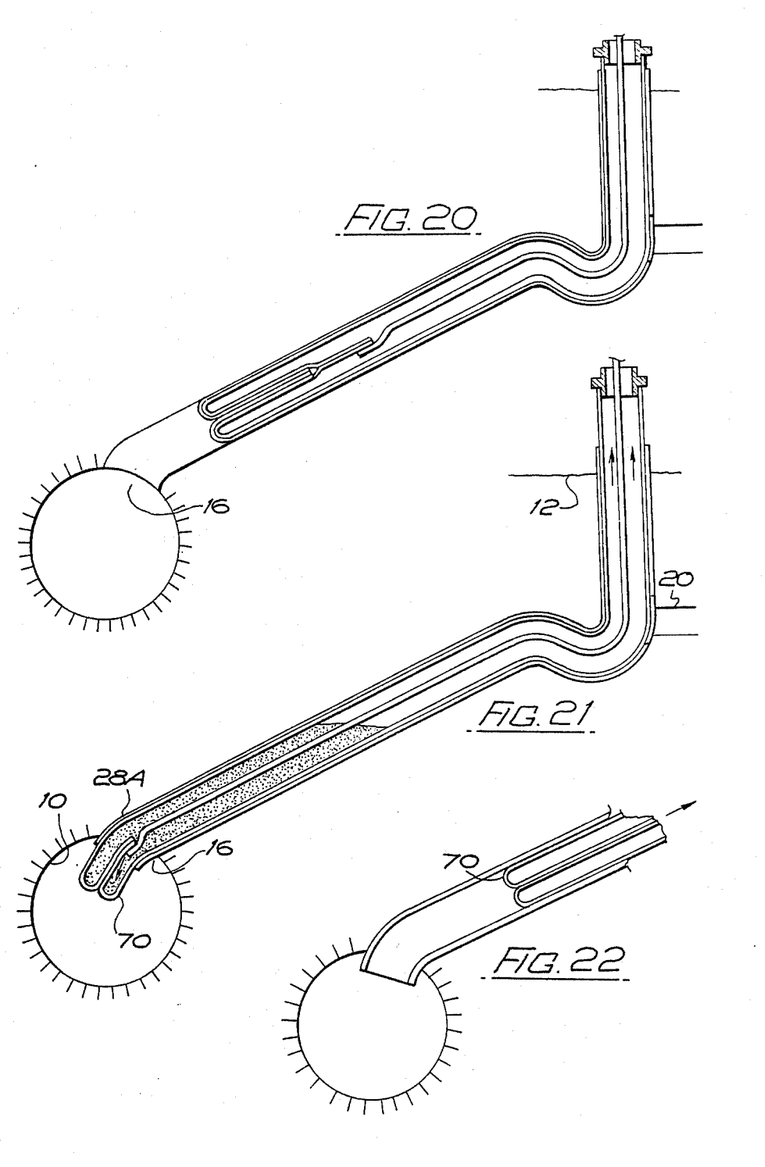

When this position is reached, it is now simply a matter of re-introducing air under pressure into the inflation tube 52 to cause the carrier tube to re-evert and this causes re-eversion of the lining sleeve 70. Thus, FIG. 18 shows the extremity portion unfolded after manipulation of the device of FIG. 14. The device is then removed by pulling upwardly in fact before the air under pressure is supplied to perform the re-eversion. FIG. 19 shows how the assembly is re-everted, the carrier tube turning the lining tube inside out and onto the surface of the lateral pipe 14, and the eversion continues on to the position shown in FIG. 21 is reached when the lining 28A has been applied throughout the entire length of the lateral and cleanout pipe between the opening 16 into the main sewer 10 and the opening of the cleanout pipe 18 to the ground 12. The lining may be selected so that it projects slightly above the ground and slightly into the main sewer 10 as shown. It will also be noticed that the aperture in the lining registers with the discharge pipe 20.

FIG. 20 in fact shows an intermediate position during the lining operation.

When the sleeve has been applied as indicated in FIG. 21, hot water is then introduced into the interior of the carrier tube 70 so as to pull the carrier tube and displace the air therefrom. The displaced air leaks from the assembly through the central bore of the plate 48 as shown by the arrows 104 in FIG. 6. The said central aperture of the plate 48 may be provided with a gland which allows air to flow out in the manner indicated by arrows 104 during the operation of filling up of the interior of the carrier pipe 70 with water. The water is hot so that it will cause the application of heat to the lining sleeve and therefore effect or commence curing of the resin so that the lining sleeve becomes hard rigid pipe on the lateral pipe surface. When the curing has been completed or is sufficiently complete, the carrier tube 70 is then simply removed as shown in FIG. 22 by re-inverting the tube. As the tube is of silicone rubber which has a characteristic such that it does not bond or bind to the resin used for impregnating the lining sleeve, removal of the tube 70 is relatively easy, and it can be re-used for further similar procedures.

Figure 23:
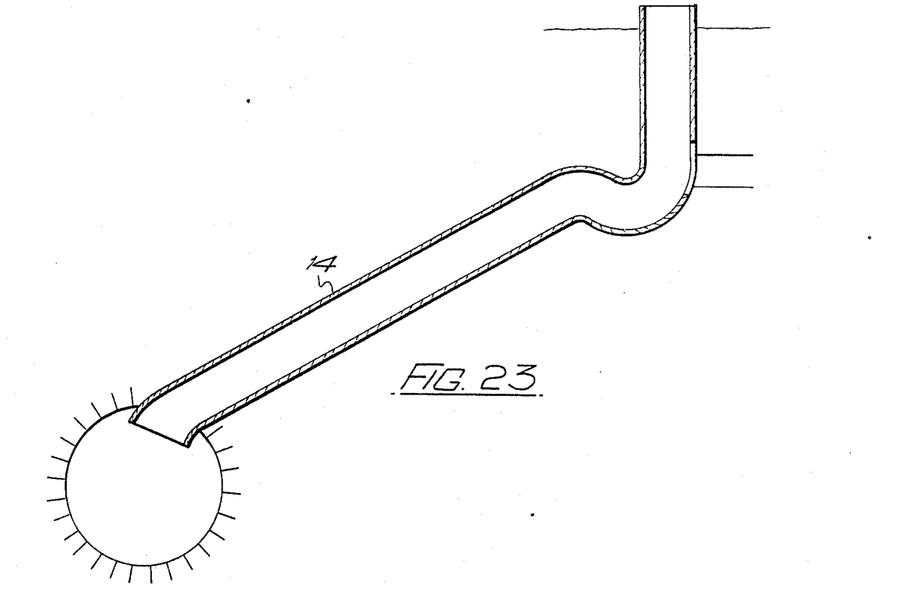

FIG. 23 shows the finished, re-lined lateral pipe 14, and the ends which project into the sewer and above ground level can be trimmed off with an appropriate machine as desired.

FIGS. 1 to 23 shows specific application of the invention, but it is to be pointed out that the invention has wider application and can be used for the lining of pre-set lengths of any pipeline or passageway.

Figure 24:
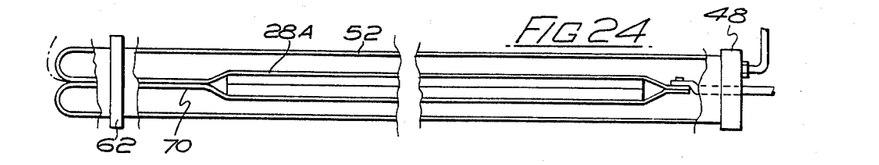
FIG. 24 shown in sectional elevation an assembly of carrier tube and inpregnated sleeve for lining a main sewer pipe.

If reference is made to FIG. 24, an arrangement is shown wherein the entire length of the lining sleeve 28A has been drawn into the inside of the carrier tube 70 and in face lies between the collars 62 and 48.

Figure 25:
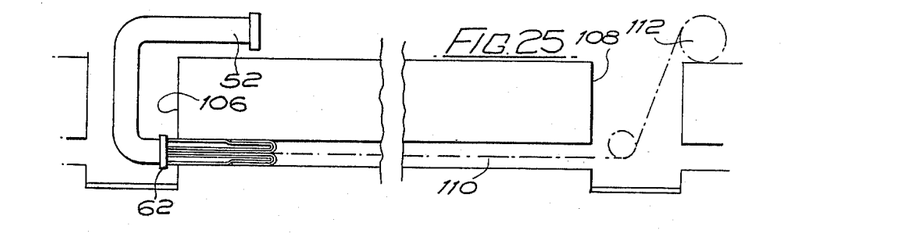
FIGS. 25 and 26 show how the assembly of FIG. 24 is used for the lining of a main sewer pipe.
Figure 26:
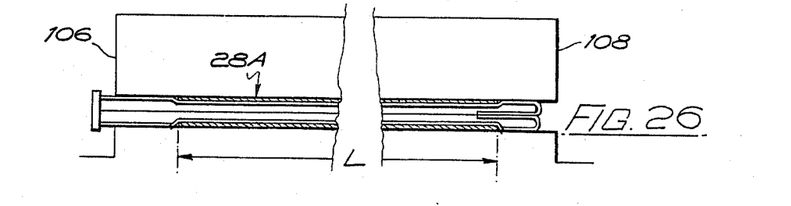

By positioning the assembly 24 at any particular location in relation to a pipeline or passageway, so the lining sleeve 28 can be placed in a particular location. FIGS. 25 and 26 show how the assembly of FIG. 24 can be used for placing the lining 28A over a length L of an underground main sewer which extends between two manholes 106 and 108. The collar 62 is simply positioned in register with one end of the sewer and then the tube 70 is everted so that the lining sleeve 28 also comes to be everted but at the predetermined position to cover length L of the sewer. FIG. 25 shows the assembly in the initial stages of eversion, whilst FIG. 26 shows the eversion completed and the lining sleeve 28A in the desired position.

FIG. 25 also shows that it is possible to use a pull through tape, rope or cable or the like 110 which passes up the centre of the assembly of lining sleeve and carrier tube and has one end connected to a winch 112 at the other manhole 108. As the air under pressure is blown into the inflation sleeve 52, simultaneously a pull may be applied by the winch 112 on the pull through tape 110 to assist the eversion process necessary.

The invention has particular advantage in that a preset length of lining tube which is simply in the form of a resin absorbent layer can be placed in position in a passageway without of necessity having to re-line the entire passageway. Also, it is not necessary to use a resin absorbent material which has a coating providing an inversion membrane as is required in the said U.S. patent.

Whilst any suitable materials can be used for the lining sleeve, we prefer to use polyester felt and a polyester resin impregnated said felt.

Also, instead of inverting the lining sleeve into a lateral from ground level as shown, the lining sleeve can also be everted into the lateral from inside the main sewer 10, although in such case it may be necessary or desirable to use a directing device for ensuring that the end of the assembly of carrier tube and lining sleeve points directly at the lateral opening 16.

The method provides a means particularly for lining lateral pipe connections such as 14 shown in FIG. 1, and provides an effective means whereby egress from and ingress into the lateral are prevented.

What is claimed is:

1. A method of lining a pipeline or passageway with a tubular sleeve comprising a flexible resin absorbent material, said method comprising the steps of:
   (ia) impregnating the tubular sleeve with a curable synthetic resin;
   (ib) everting a flexible carrier tube into one end of the resin-impregnated sleeve, along the inside of the sleeve and out of the other end of the sleeve;
   (ic) inverting the carrier tube in the opposite direction to pull one end of the sleeve into the inside of the carrier tube so that at least a substantial portion of the sleeve is drawn into the inside of the carrier tube;
   (id) positioning one end of the assembly or carrier tube and resin-impregnated sleeve in operative position in relation to a passageway to be lined;
   (ie) everting the carrier tube by fluid pressure into the passageway so that the impregnated sleeve is also everted into the passageway and lies on the passageway surface between the carrier tube and the said passageway surface; and
   (if) causing or allowing the resin to cure while it is so held to the passageway surface.

2. A method according to claim 1, wherein the said carrier tube is of a polymeric material which does not bond to the resin, and including the step of
   (iia) removing the carrier tube after curing of resin by re-inverting the carrier tube, so that it may be re-used.

3. A method according to claim 2, wherein the said carrier tube comprises silicone rubber.

4. A method according to claim 1, wherein the tubular sleeve is contained in a flexible envelope of synethetic plastics material and the step of impregnating the tubular sleeve comprises the step of
   (iia) introducing the resin into the envelope while a vacuum is applied thereto to remove air from the absorbent material, and further including the step of
   (iib) removing the said envelope as the sleeve is being pulled into the inside of the carrier tube.

5. A method according to claim 1, including the steps of
   (va) measuring the length of pipeline or passageway to be lined;
   (vb) using a corresponding length of sleeve;
   (vc) pulling the sleeve into the carrier tube to a predetermined extent and positioning the assembly in relation to the passageway to ensure that the sleeve is positioned on the required length of pipeline or passageway.

6. A method according to claim 1, including the step of
   (via) everting the carrier tube into the passageway by means of air pressure.

7. A method according to claim 1, including the step of (viia) everting the carrier tube into the passageway using liquid pressure.

8. A method according to claim 7, wherein the passageway being lined is substantially horizontal, including the step of
(viiia) using for everting the carrier tube in accordance with step (ie) a liquid having a specific gravity substantially equal to that of the assembly comprising the carrier tube and the impregnated sleeve so that the inwardly travelling portion of said assembly before the eversion is buoyantly supported by the liquid.

9. A method according to claim 1, wherein the resin is cured by introducing hot water into the carrier tube when it is in the position holding the impregnated sleeve to the passageway surface by supplying hot water through a hose connected to an end of the carrier tube.

10. A method according to claim 1, wherein the method is used for the lining of a lateral pipe connecting the sewage system of a building to an underground sewer, including the step of
(xa) everting the carrier tube into the passageway from above ground.

11. A method according to claim 10, wherein the method is used for lining a lateral pipe which has a water trap bend a predetermined depth below ground and has a clean out pipe leading to ground level including the steps of
(xa) providing that the sleeve is drawn into the carrier tube to a limited extent so as to leave an extension portion to the outside of the carrier tube;
(xb) folding an extremity of said extension portion over a displacing device, effectively reducing the length of the extremity portion to said predetermined depth;
(xc) introducing the extension portion with the folded over extremity vertically into the clean out pipe until the extremity portion passes said water trap bend;
(xd) moving the displacing device to cause the extremity portion to unfold; and
(xe) performing the said everting steps (ie) and (if).

12. A method according to claim 11, including the step of
(xi) selecting the length of the sleeve so that the sleeve lines the clean out pipe and the lateral from ground level to the position where the lateral meets the main sewer.

13. A method according to claim 11, wherein a building service pipe meets the clean out pipe at the water trap bend, and including the steps of
(xiiia) cutting a portion of the sleeve to provide an aperture in the extension portion; and
(xiiib) positioning the said aperture in register with the service pipe so that when the sleeve has been applied the service pipe will be maintained in fluid communication with the lateral through the said aperture.

14. A method according to claim 1, wherein the flexible carrier tube is everted into the tubular sleeve by the following steps
(xiva) providing an inflation device comprising a leading collar and a trailing collar connected by an inflation tube;
(xivb) introducing an end of a hose into the inflation tube through the trailing collar;
(xivc) introducing one end of the carrier tube into the tubular sleeve through the leading collar;
(xivd) connecting said one end of the hose to said one end of the carrier tube;
(xive) connecting the other end of the carrier tube to the leading collar after turning same upon itself, said trailing collar having an aperture therein whereby air under pressure may be introduced into the interior of the inflation tube whereby the carrier tube is everted out of the leading collar, and said trailing collar further including a gland through which the hose feeds as the carrier is everted out of said leading collar.

15. A method according to claim 14, wherein said hose is a water hose and when water is introduced through same into the interior of the everted carrier tube displaced air can escape through said gland.

16. A method according to claim 1, wherein the step of impregnating the sleeve takes place after the step of everting the carrier tube into the sleeve.

* * * * *